(12) United States Patent
Feldman et al.

(10) Patent No.: US 10,881,200 B2
(45) Date of Patent: *Jan. 5, 2021

(54) INTEGRATED, MODULAR SHELVING SYSTEM

(71) Applicants: Aaron Joseph Feldman, Berkeley, CA (US); Trevor Caldwell Thorpe, Kensington, CA (US)

(72) Inventors: Aaron Joseph Feldman, Berkeley, CA (US); Trevor Caldwell Thorpe, Kensington, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/602,040

(22) Filed: Jul. 26, 2019

(65) Prior Publication Data

US 2020/0085188 A1 Mar. 19, 2020

Related U.S. Application Data

(63) Continuation-in-part of application No. 15/731,694, filed on Jul. 19, 2017, now Pat. No. 10,524,452.

(51) Int. Cl.
| | |
|---|---|
| *A01K 15/02* | (2006.01) |
| *A47B 57/04* | (2006.01) |
| *A47B 96/07* | (2006.01) |
| *A47B 47/00* | (2006.01) |
| *A47B 96/06* | (2006.01) |
| *A01K 1/035* | (2006.01) |
| *A47B 96/02* | (2006.01) |
| *A47B 47/04* | (2006.01) |

(52) U.S. Cl.
CPC .......... *A47B 47/0091* (2013.01); *A01K 1/035* (2013.01); *A01K 15/027* (2013.01); *A47B 47/0016* (2013.01); *A47B 47/0075* (2013.01); *A47B 47/047* (2013.01); *A47B 57/04* (2013.01); *A47B 96/028* (2013.01); *A47B 96/061* (2013.01); *A47B 96/063* (2013.01); *A47B 96/07* (2013.01)

(58) Field of Classification Search
CPC ...... A47F 5/08; A47F 5/10; A47F 5/16; A47F 2005/165; A01K 15/024; A01K 15/02; A01K 15/027; A01K 1/035; A47B 96/06; A47B 96/028; A47B 47/0091; A47B 47/0016; A47B 47/0075; A47B 96/061
USPC .......................... 248/325, 239, 241, 242, 250
See application file for complete search history.

(56) References Cited

U.S. PATENT DOCUMENTS

| | | | |
|---|---|---|---|
| 7,934,470 B1 * | 5/2011 | Barker ................. | A01K 15/024 119/28.5 |
| 8,707,906 B1 * | 4/2014 | Trojanowski .......... | A01K 1/035 119/706 |

(Continued)

*Primary Examiner* — Daniel J Colilla
(74) *Attorney, Agent, or Firm* — Savantek Patent Services; Ivan E. Rozek (57) ABSTRACT

A modular shelving system with a series of shelves, shelf-support brackets, bracket attachment disks, and hinge-pins. The support brackets are hingable. The support disks each include a series of apertures for allowing the disk to be fastened to a wall or stud. The shelf support brackets include shelf-receiving slots. The hinge-pin is threaded to be screwed into the bracket-receiving disks. The shelves are inserted into the shelf-receiving slots in the shelf-support brackets to create a custom multipurpose shelf design, including for climbing animals such as cats.

5 Claims, 15 Drawing Sheets

(56) References Cited

U.S. PATENT DOCUMENTS

2007/0125738 A1* 6/2007 Sevack ............... A47B 96/066
 211/187
2015/0096954 A1* 4/2015 Liu .................... A47B 47/0025
 211/186
2017/0280874 A1* 10/2017 Sosso .................... A47B 96/07

* cited by examiner

INTEGRATED, MODULAR SHELVING SYSTEM

FIELD OF THE INVENTION

An Integrated, modular and wall-mounted shelving system with optional add-on features designed for climbing animals, such as domestic cats

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

The field of the present invention is modular shelves that are mounted to a wall. Though the invention is usable as shelves for books or decorative items, the present invention is particularly useful as a modular climbing and perching system for climbing animals.

Climbing pets, such as domestic cats, love to climb up to, walk, run, jump, play, and perch on surfaces that are some distance from the ground. Many cat-climbing devices are available on the market today, including carpeted climbing posts that have shelf-like surfaces attached to the post at different levels. Some cat climbing enthusiasts have invented patent shelf systems for cats such as Thomas Conwell's now expired U.S. Pat. No. 5,809,933 showing a plurality of shelves that are mounted at different levels on a wall. More recently N. Bruce Barker, in his U.S. Pat. No. 7,934,470 describes a cat perch system that uses a series of horizontal posts mounted to a wall where flexible panels can be attached and extend from one post to another to create a series of shelves that a cat can climb or sit on. Additionally, the posts extend from a horizontal support plate, and the support plate is then screwed to the wall, creating additional materials and expense to attach the posts to the wall. The design options and aesthetics of the room are also compromised.

Although the Barker patent uses the posts as a hinge point to join adjacent shelves together, it does not accommodate for the ability to join two rigid shelves together in a hinged fashion. The shelves are loosely attached to the posts to achieve shelf angles. The inability to join rigid shelves together via a rigid connection to a hinged bracket results in limited load capacity otherwise achieved by such a rigid system that spreads the load of a single shelf across all interconnected shelves and brackets mounted to the wall. The lack of such rigid interconnectedness in the Barker patent creates dependence upon fastening the support plate to studs or structural shear wall to achieve stability and sufficient load bearing capacity.

Henry Trojanowski and Tammy Obert, in their U.S. Pat. No. 8,707,906 B1, describe an elevated animal perch assembly that that is lowered from the ceiling on a plurality of chains. Latticed walkways are connected to chains that are coupled to the ceiling and braced to walls using L-shaped brackets. A perch system that is coupled to the ceiling presents installation difficulties and complexities inherent to a ceiling-to-wall mounted system not present in an easy to install wall-mounted system.

Lloyd Sevack, in his patent US 2007/0125738 A1, achieves a high load capacity using blind shelf supports mounted by fasteners driven into studs. Angled shelving can be achieved with the Sevack patent by varying the height of the supports, but designing a stable integrated shelving system is limited by the requirement of mounting to studs, by which the load capacity is achieved.

Jung-Hia Liu, in his patent US 2015/0096954, achieves a modular shelving system using hexagonal wall-mounted plates. From each corner of the plate extends a frame-member that has three equally distributed slots into which shelf boards are inserted. An integrated shelving system is possible by connecting a plurality of hexagonal plates and shelf boards, but design options and angles are limited to the hexagonal shape and the uniform length of the shelf boards. Further, if openings in the shelf boards are created to allow a pet to climb from one hexagon to another, it is limited to a stair-step design that does not allow for extended runs at a variety of angles for climbing pets.

Jerome F. Sosso and Tony Amalathithada, in their patent US 2017/0280874 A1, achieve a system of angled shelves using notched bracket assemblies attached to adjustment and locking structures mounted to a wall. The design is limited by the installation of a rigid wall-mounted structure onto which the brackets are attached. The Sosso and Amalathithada patent is not suitable for climbing pets because it adjusts the shelves to extend from the wall at an angle, for display purposes. A shelf system suitable for climbing pets extends horizontally from the wall, i.e., with the shelf ends parallel to the floor, and running along the wall lengthwise at an angle from the floor.

BRIEF SUMMARY OF THE INVENTION

The primary object of the invention is to provide a modular system of rigid shelves and brackets that allows a cat or other climbing animal to walk, run, climb, and perch on a variety of levels.

Another object of the invention is to provide a climbing animal shelf system that allows the user to adjust shelves, ramps, climbing poles and other shelf-types to a variety of angles when fastened to a wall.

Another object of the invention is to provide a cat shelf system that can be modified to include play toys and other accessories that can be connected to the shelves.

Another object of the invention is that the shelving system becomes increasingly stable as each additional rigid shelf is interconnected as an integral part of the system by use of the brackets.

Another object of the invention is that a system of two or more interconnected rigid shelves can be installed in a non-parallel configuration on vertical walls composed of sheetrock with the use of wall anchors to achieve sufficient stability and load capacity for active motile use by climbing animals.

A further object of the invention is to provide a shelf system whose shelves and brackets are designed to be covered with a carpet material.

Yet another object of the invention is to provide a shelf system that can be easily customized to adapt to a wide variety of wall arrangements without the design-limiting factor of a requirement that brackets be attached to wall studs or structural shear wall to achieve stability and adequate load capacity for climbing animals.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a modular shelving system comprising: a plurality of shelves, a plurality of shelf support brackets, a plurality of bracket attachment disks, a plurality of hinge pins, said support brackets being hingable to achieve a variety of angles, said support disks each including apertures for allowing said disk to be fastened to a wall, said shelf support brackets including shelf receiving slots, said hinge-pin including a threaded distal end capable of being screwed into a central threaded female aperture in to said bracket receiving disk, said hinge-pin also including a tool receiving aperture, allowing a user to screw said hinge-pin into said bracket receiving disk, and said shelves capable of being inserted into said shelf receiving slots in said shelf support brackets creating a modular shelving system ideal for climbing animals such as domestic cats.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
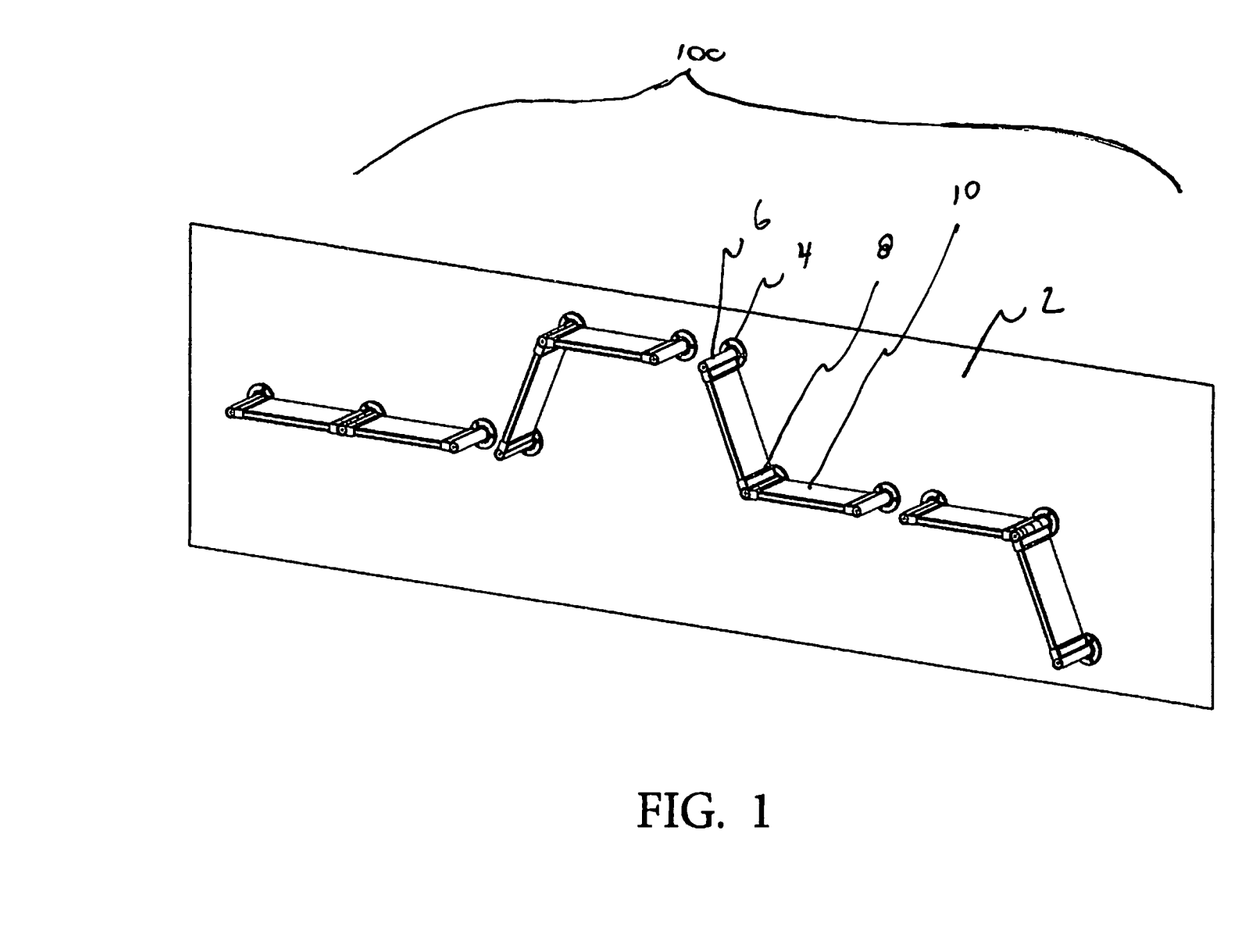
FIG. 1 is a perspective view of the invention attached to a wall.

Referring now to FIG. 1 we see a perspective view of the invention 100 which is a series of shelves 10 end brackets 6, a central bracket assembly 8 and bracket holding disks 4 that hold the shelves to the wall 2. The shelves 10 are rigid and can be sized to any length that the user wishes based on the overall size and length of the wall and complexity of the shelf system desired.

Figure 2:
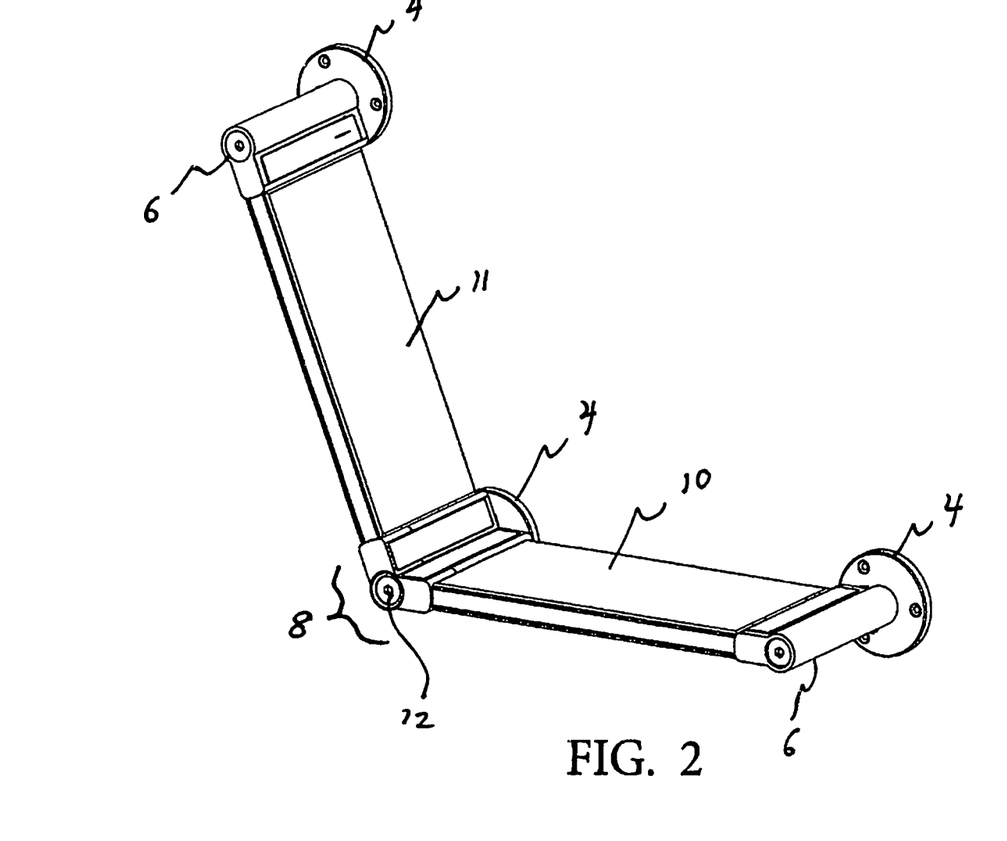
FIG. 2 is a perspective view of two shelves seen from the front connected by a hinged bracket.

FIG. 2 is a perspective view of two shelves 10, 11 connected by a central bracket assembly 8 and two end brackets 6, each attached to their own bracket support disks 4. The shelves 10, 11 can be joined at a variety of angles based on the user's design choices.

Figure 3:
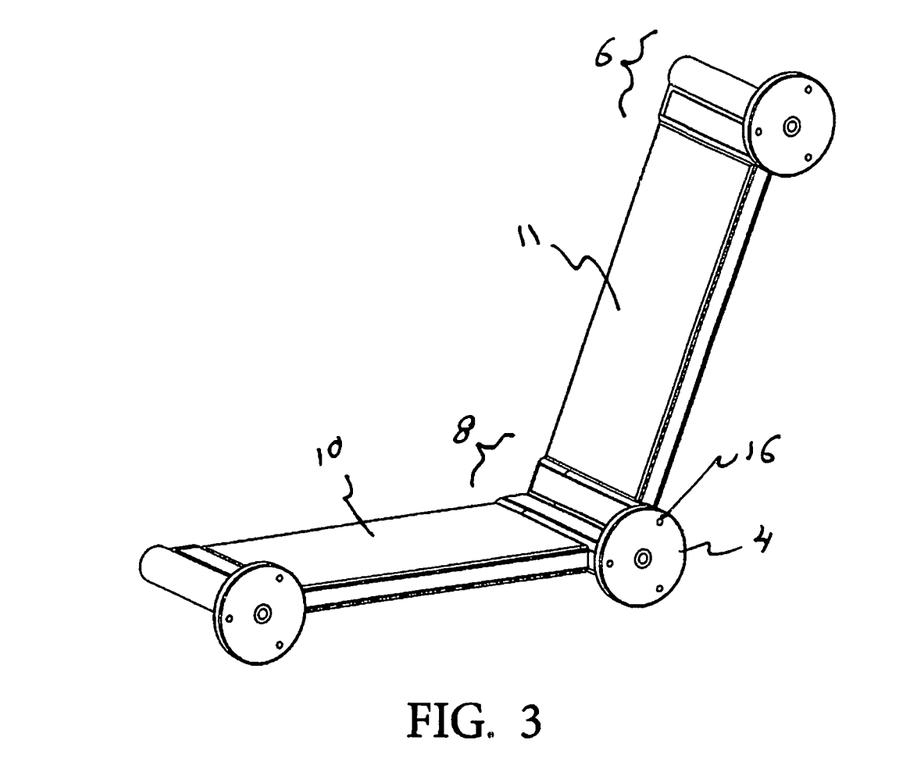
FIG. 3 is a perspective view of two shelves seen from the rear connected by a hinged bracket.

FIG. 3 is a perspective view of the same two shelves 10, 11 seen from the rear.

Figure 4:
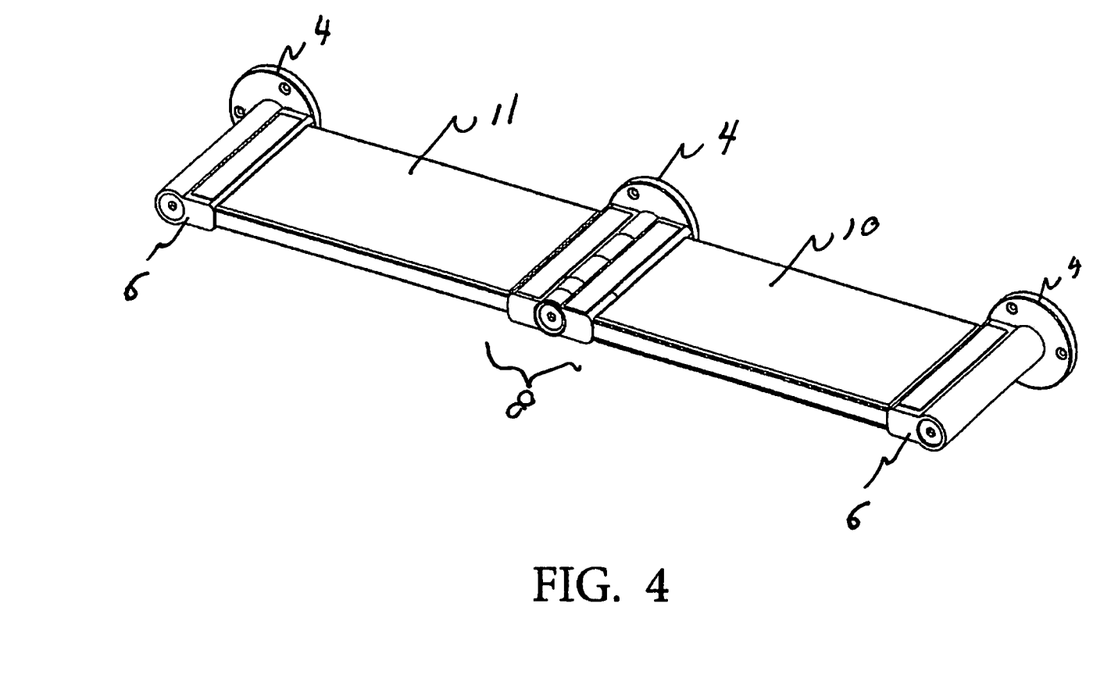
FIG. 4 is a perspective view of two shelves that are in a parallel configuration.

FIG. 4 shows the shelves 10, 11 in a parallel position with respect to each other. The shelves can be angled to any degree of angle.

Figure 5:
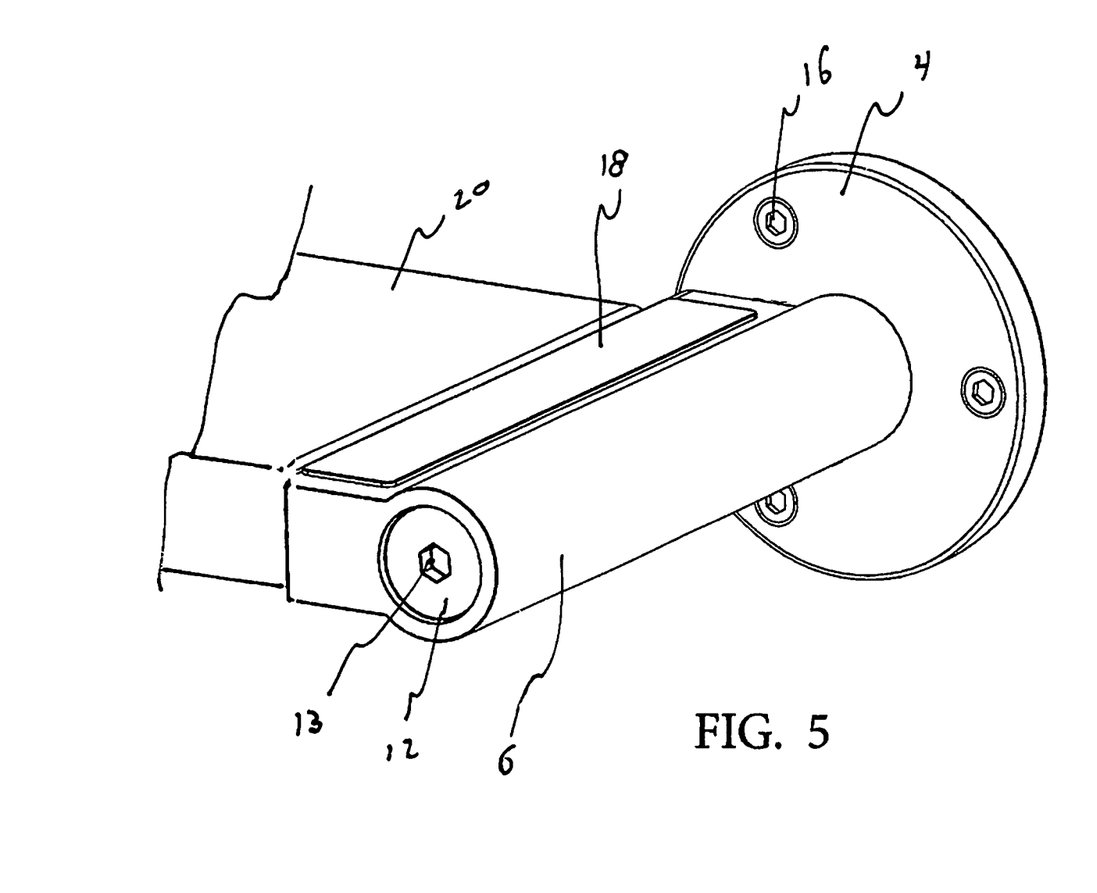
FIG. 5 is a partial perspective view of the shelf end cap bracket and support

FIG. 5 is a partial perspective view of a post 12 and the end cap bracket 6 and a portion of a shelf covered by carpeting 20. The end cap bracket 6 includes recessed portions that can retain a panel of carpeting 18. This feature allows the entire shelf and bracket surface to be covered by carpeting or other material that is attractive to cats or other climbing animals.

Figure 6:
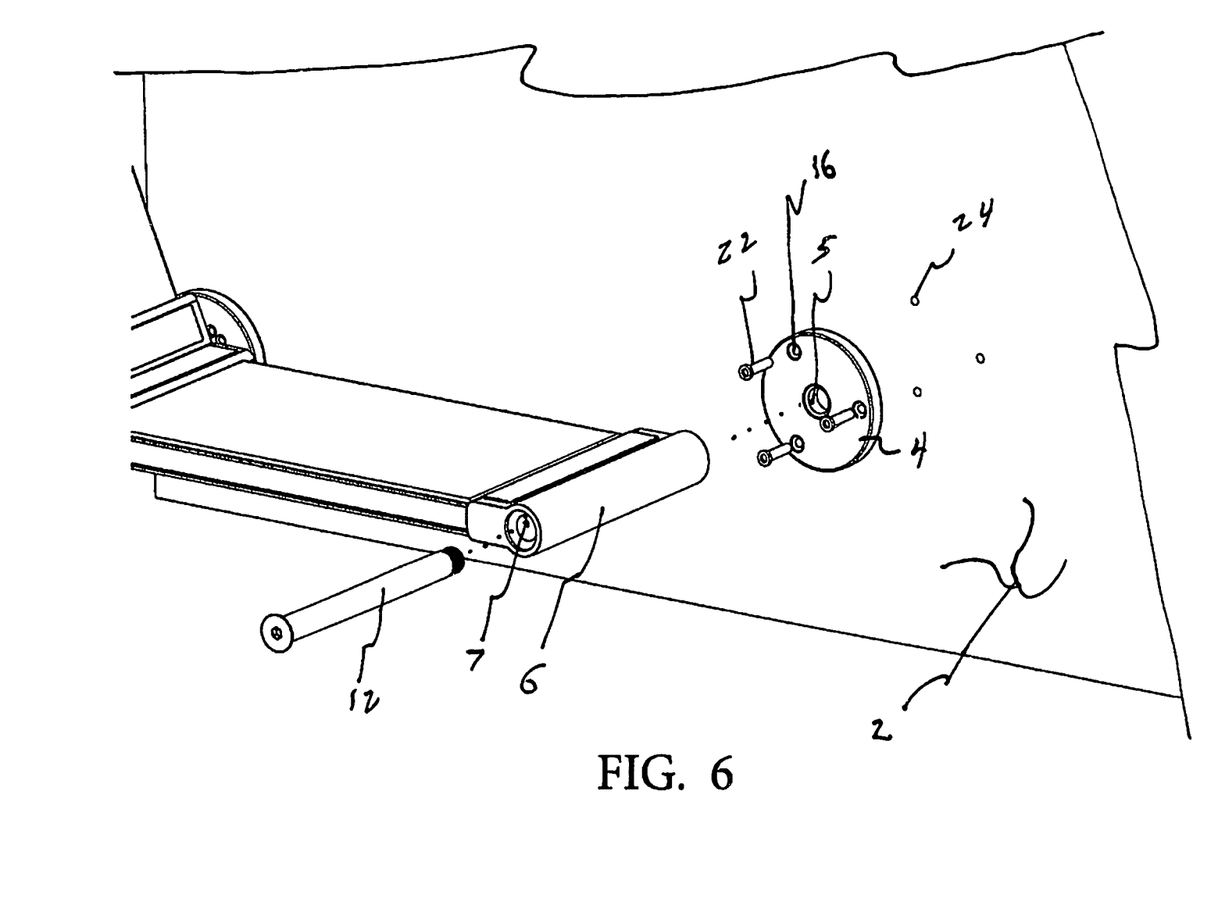
FIG. 6 is an exploded view of a shelf being attached to a wall.

FIG. 6 is an exploded view that clearly shows how in the disk 4 is attached by screws 22 through aperture 16. The end cap bracket 6 is attached with screws through holes 24 a wall 2 or stud located within the wall 2.

Figure 7:
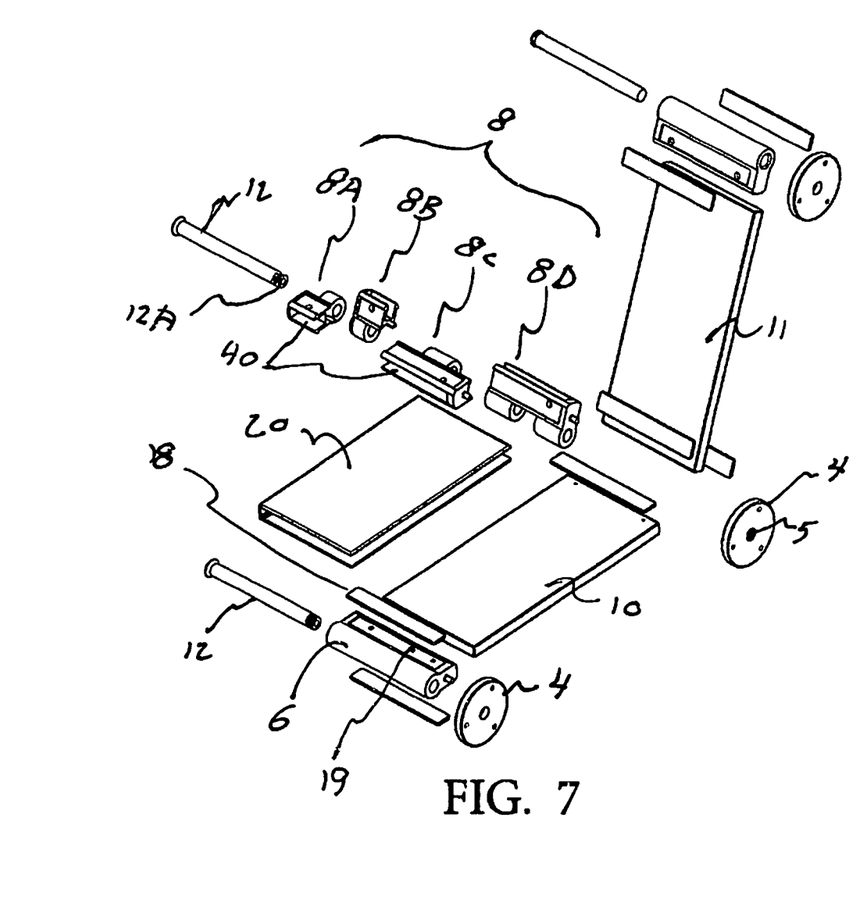
FIG. 7 is an exploded view of the invention.

FIG. 7 is an exploded view of the invention. The hinge bracket 8 is made up of end caps 8A, 8B, first hinge member BC and second hinge member 8D. The post 12 is inserted into all the hinge bracket members BA, 8B, BC, 8D so that the threaded portion 12A can be screwed into threaded aperture 5 in disk 4. The brackets 6, 8 each include slots 40 in which the shelves 10, 11 can be inserted. Carpet or fastening panels 20, can be clearly seen which sit in depressions in the bracket members 6, 8 and are adhered by standard means into the recessed areas 19 of the brackets 6, 8.

Figure 8:
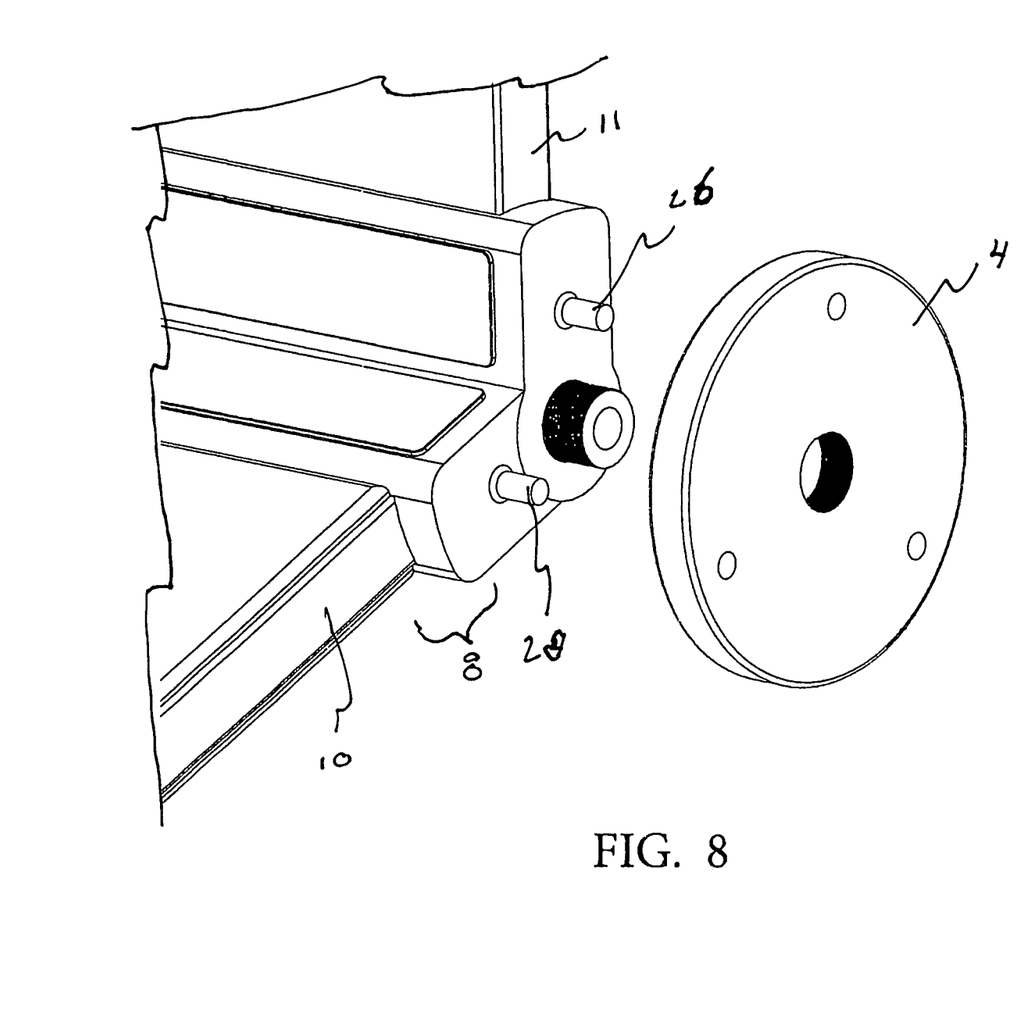
FIG. 8 is a partial perspective view of the hinged shelf support and support

FIG. 8 is a partial perspective view of shelves 10, 11 plugged into the hinge bracket 8.

Figure 9:
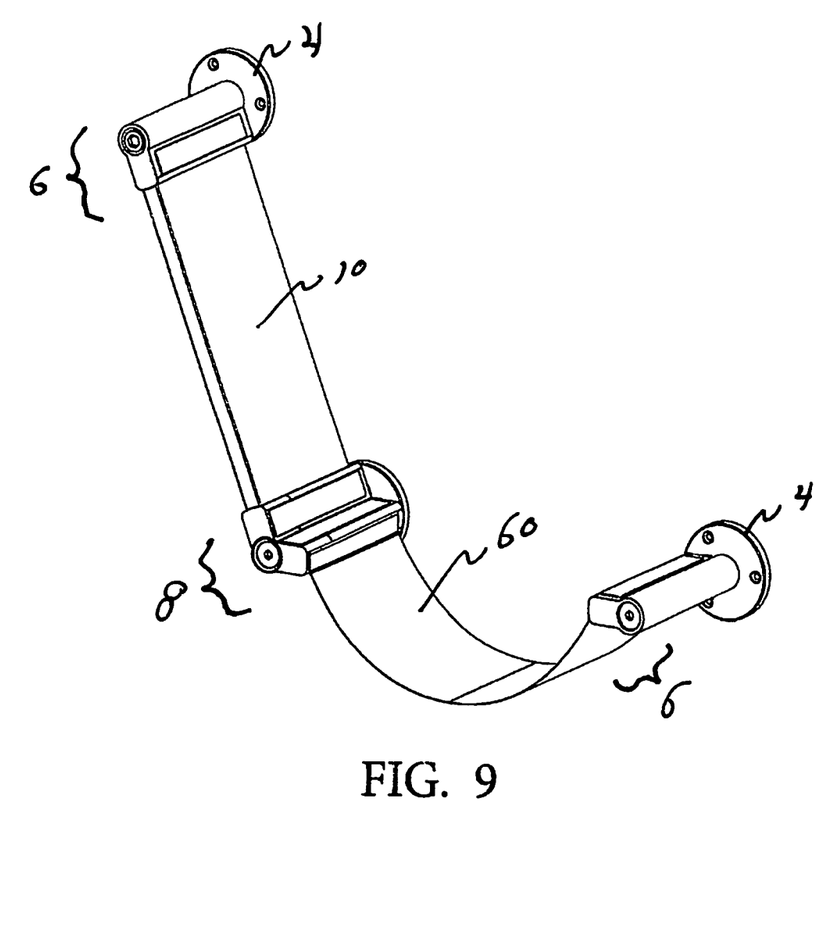
FIG. 9 is a perspective view of the invention with a flexible shelf member.

FIG. 9 is a perspective view of the invention with a flexible panel 60 made out of fabric or other flexible material. This can be an alternative to the shelves 10, 11 described previously.

Figure 10:
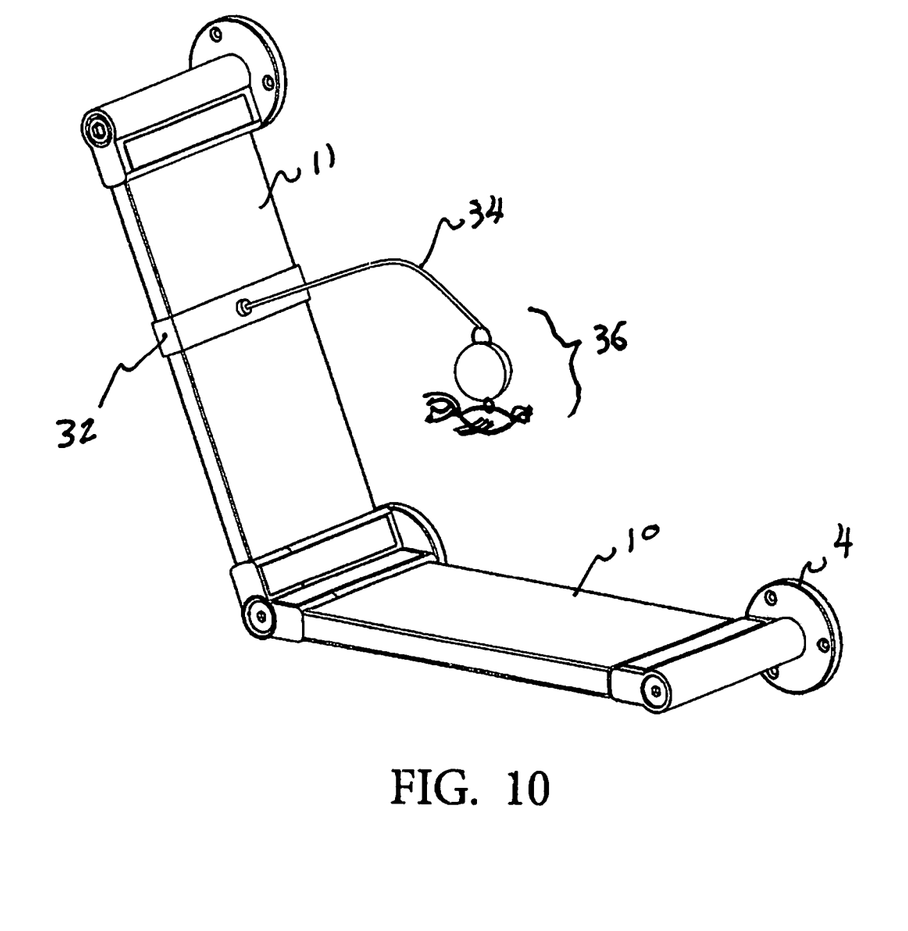
FIG. 10 is a perspective view of the invention with a cat toy attached.

FIG. 10 is a perspective view of the invention with the addition of a cat toy 36, which is comprised of an attachment panel 32 that slides onto the shelf 11. An elongated member 34 is attached at one end to the attachment panel 32 and at the other end to a cat toy 36 such as a representation of a bird. The attachment panel 32 can be slid to any height and remain there via frictional forces. A wide variety of toys can be attached to the flexible rod 34. Rod 34 can also be a variety of lengths. Other items that can be attached to the shelves are various lengths of poles which may be covered in carpet or sisal rope for a pet to climb on.

Figure 11:
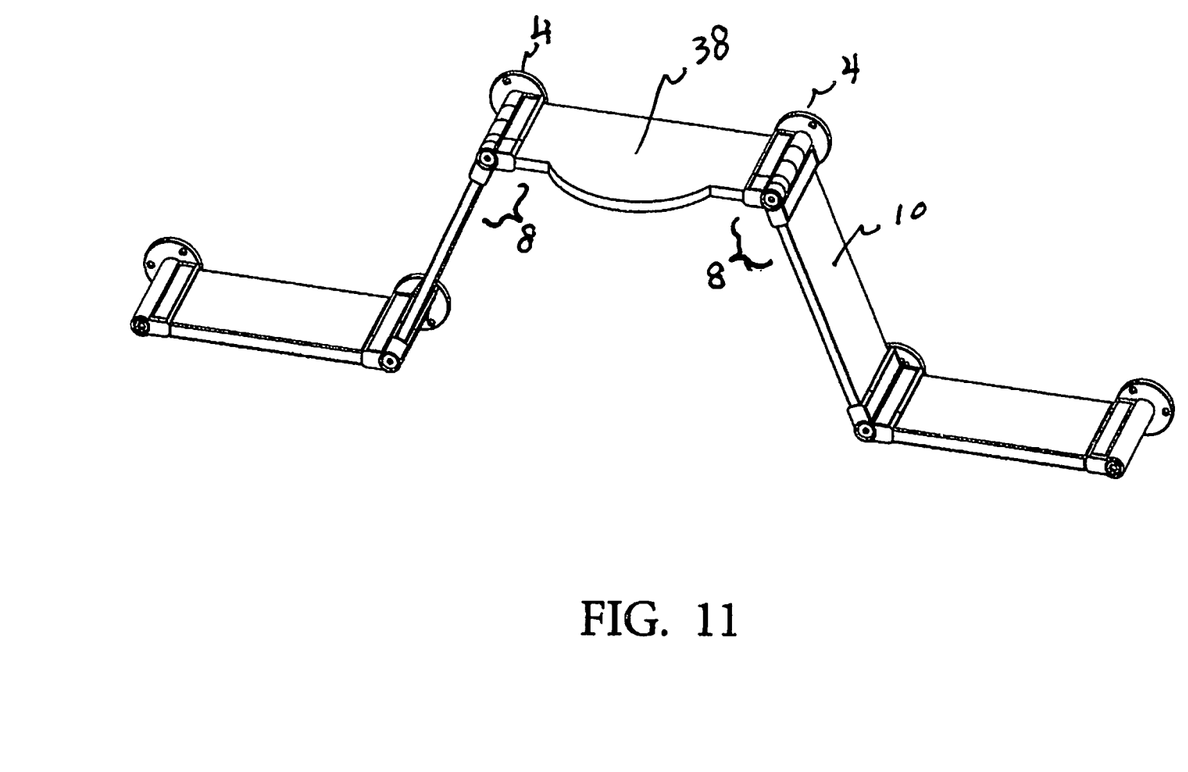
FIG. 11 is a perspective view of the invention with a forwardly extended shelf.

FIG. 11 is a perspective view of the invention showing one shelf 38 having a forwardly disposed extension allowing a climbing animal such as a cat to have a larger panel upon which to perch.

Figure 12:
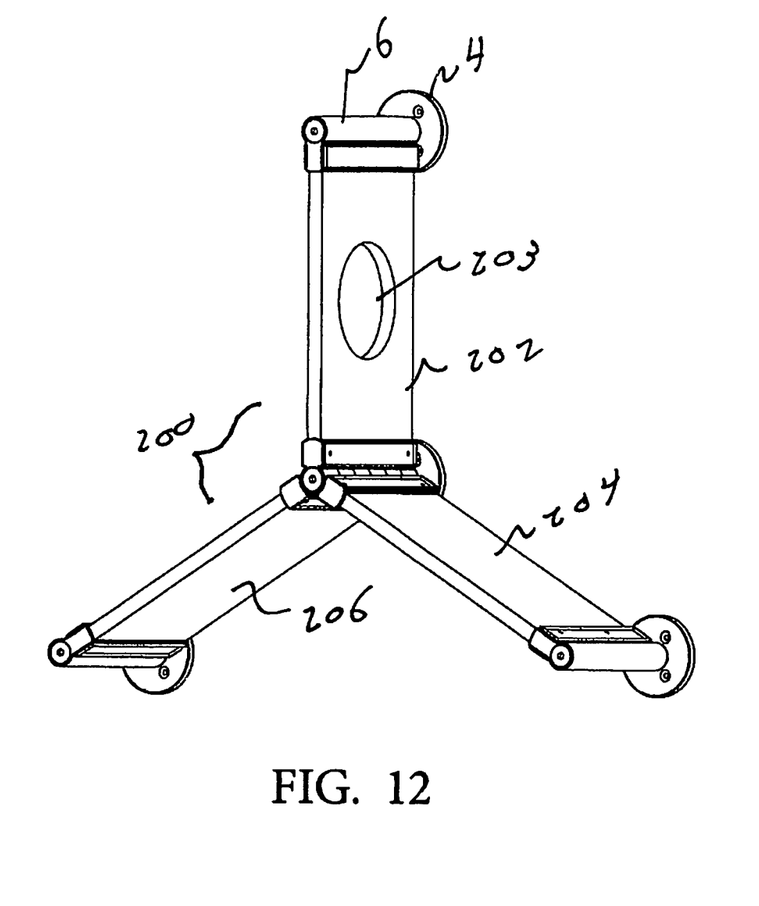
FIG. 12 is a perspective view of an alternate embodiment of the invention with a three-way hinge capability.

FIG. 12 is a perspective view of an alternate embodiment of the hinge member 200 that allows three shelves 202, 204, 206 to be attached rather than two. The shelves can terminate in the end cap bracket 6 and be supported by the support disk 4, as in the original embodiment. In the embodiment shown, a shelf member 202 includes a through-hole 203 that can let a pet walk, climb, or jump through the hole 203 from one shelf 204 to another 206. This configuration gives extra stability, design options, and play value to the entire shelf assembly.

Figure 13:
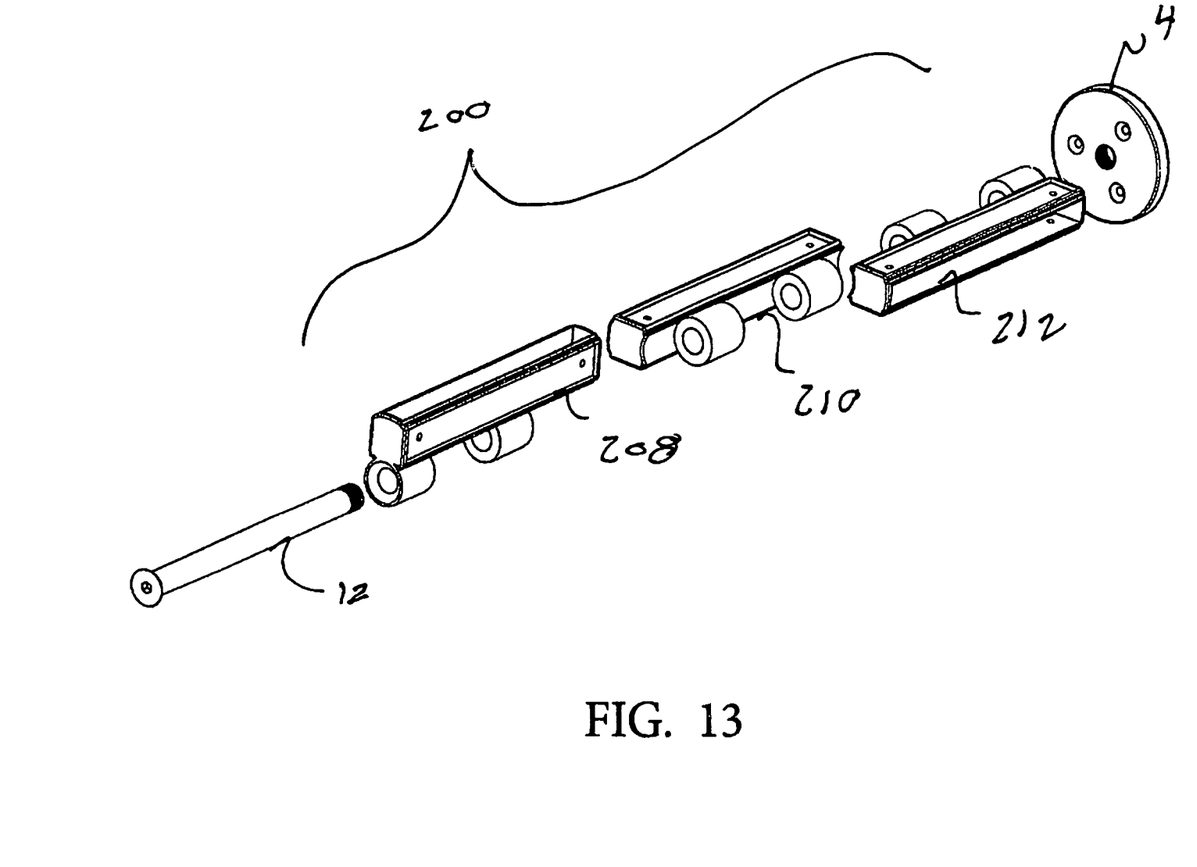
FIG. 13 is an exploded view of the three-way hinge.

FIG. 13 is an exploded view of the three-way hinge 200. Shelf-receiving brackets 208, 210 and 212 are pinned together by 12, which threads into the support disk 4, as in the original embodiment.

Figure 14:
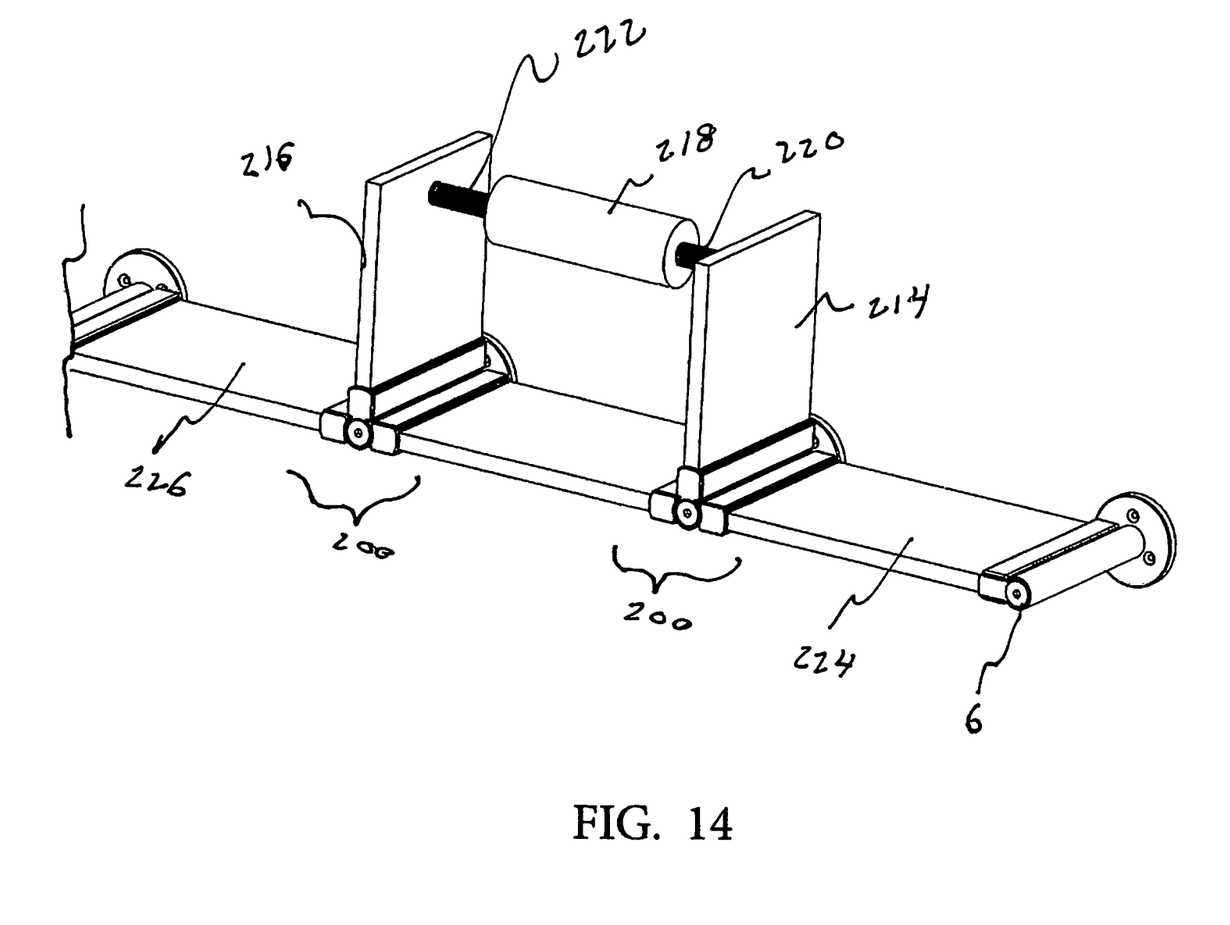
FIG. 14 is a perspective view of the three-way hinge in use.

FIG. 14 shows another design that can be accomplished by the three-way hinge 200. In this version two shelves 214, 216 are placed vertically, and a horizontal carpet covered cylinder 218 supported by compression springs 220, 222 so that a cat can walk along a horizontal shelf 224, then climb up shelf 214, walk across cylinder 218 which will be moving slightly due to the movement of springs 220, 222, and continue down shelf member 216 and onto horizontal shelf member 226.

Figure 15:
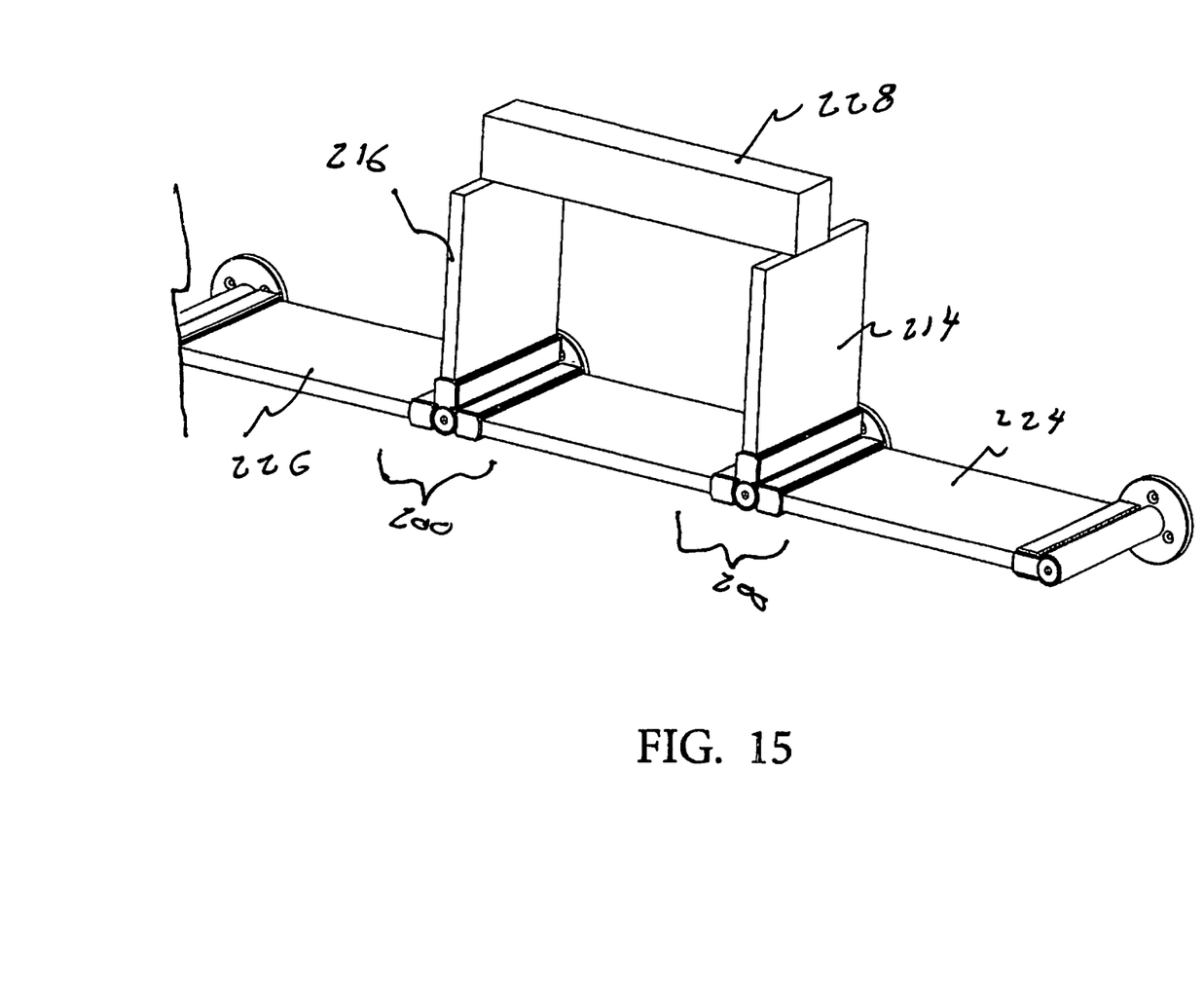
FIG. 15 is a perspective view of a second version of the three-way hinge in use.

FIG. 15 is another variation that can be accomplished with the three-way hinge 200. This version substitutes a wooden narrow plank 228 for the cylindrical member 218. The wooden narrow plank 228 allows a cat to walk on a narrow beam, which also provides interest and exercise for the cat.

It should be noted that other features can be added to the shelves 10, 11 such as sound speakers, large apertures for allowing a cat to pass through the shelf member, transparent shelf members so that a person can see a cat from underneath, shelves with places to store food or water and shelves that include LED lights for night time illumination. Another option is to have interactive shelves that use motion sensing, touch sensing, and other electronic components that allow additional play features to activate for engaging cats in the environment. Activation may also be accomplished by remote means including a custom phone app.

The above described and illustrated invention allows a person to create a wide variety of custom cat climbing and perching designs using multiple brackets and disks that are each uniform in nature. A set of brackets and discs can be sold to an end user who can then cut shelving material to the ideal length to create a custom design. Alternately, the manufacturer of the brackets of the present invention can offer stock sized shelves or can interact with the end user to build custom length shelves and covered with custom carpeting or other material and send them to the end user for installation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A wall-mounted interconnected shelving system comprising:
   a plurality of shelves of different design;
   a plurality of shelf support brackets that allow for a rigid connection between shelves;
   a plurality of bracket attachment disks wherein each bracket attachment disk has a central threaded female aperture;
   a plurality of hinge pins;
   each said support bracket being rotatable about a respective one of the plurality of hinge pins;
   each said shelf support bracket including at least one shelf receiving slot;
   each said hinge pin including a threaded distal end configured to screwed into a respective one of the central threaded female apertures in said bracket receiving disks;
   each said hinge pin also including a tool receiving aperture allowing a user to screw said hinge-pin into a respective one of said bracket receiving disks; and
   said shelves configured to be inserted into said shelf receiving slots in said shelf-support brackets.

2. A modular shelving system as claimed in claim 1 wherein said shelf-support brackets include a hinged-type bracket that support two or more connecting shelves and an end cap bracket supporting an end of a shelf.

3. A modular shelving system as claimed in claim 1 wherein said plurality of shelf support brackets each include a shallow recess configured to accept carpet or fastening panels that can be attached via conventional fasteners.

4. A modular shelving system as claimed in claim 1 wherein said shelf support brackets each includes an end-cap bracket that encloses the front end of said shelf member that is being supported in a shelf receiving slot of a respective one of shelf support brackets.

5. A modular shelving system s claimed in claim 1 wherein said shelves when rigidly connected with said brackets in a non-parallel configuration will achieve stability sufficient for installation in sheetrock with the use of wall anchors without the need to be fastened to studs or structural shear wall.

\* \* \* \* \*